United States Patent [19]
Brady et al.

[11] Patent Number: 5,758,050
[45] Date of Patent: May 26, 1998

[54] RECONFIGURABLE DATA STORAGE SYSTEM

[75] Inventors: James Thomas Brady; Paul T. Burton, both of San Jose; Alden B. Johnson, Los Gatos; Jaishankar Moothedath Menon; Steven Gerdt, both of San Jose, all of Calif.

[73] Assignee: International Business Machines Corporation, Armonk, N.Y.

[21] Appl. No.: 614,460

[22] Filed: Mar. 12, 1996

[51] Int. Cl.⁶ .................................................. G06F 12/00
[52] U.S. Cl. .................................... 395/180; 711/173
[58] Field of Search .................................. 395/180, 181, 395/182.03, 182.06, 410, 412, 413, 419, 183.05, 182.07, 651; 711/100, 153, 147, 170, 171, 172, 173, 202, 203

[56] References Cited

U.S. PATENT DOCUMENTS

| | | |
|---|---|---|
| 4,435,752 | 3/1984 | Winkelman . |
| 4,601,012 | 7/1986 | Aiken, Jr. . |
| 5,018,060 | 5/1991 | Galb et al. . |
| 5,148,432 | 9/1992 | Gordon et al. ............. 371/10.1 |
| 5,301,297 | 4/1994 | Menon et al. ............. 395/425 |
| 5,303,244 | 4/1994 | Watson .................... 371/10.1 |
| 5,333,277 | 7/1994 | Searls ...................... 395/325 |
| 5,392,244 | 2/1995 | Jacobson et al. .......... 365/200 |
| 5,410,667 | 4/1995 | Belsan et al. . |
| 5,465,343 | 11/1995 | Henson et al. ............ 395/439 |
| 5,491,810 | 2/1996 | Allen ....................... 395/444 |
| 5,542,065 | 7/1996 | Burkes et al. ............. 395/441 |
| 5,546,558 | 8/1996 | Jacobson et al. .......... 395/441 |
| 5,553,285 | 9/1996 | Krakauer et al. .......... 395/601 |
| 5,588,138 | 12/1996 | Bai et al. .................. 711/173 |
| 5,592,638 | 1/1997 | Onodera .................. 711/173 |
| 5,602,995 | 2/1997 | Hendel et al. ............ 395/250 |

*Primary Examiner*—Albert Decady
*Attorney, Agent, or Firm*—Baker Maxham Jester & Meador

[57] ABSTRACT

A system for managing data storage devices of a data storage subsystem. A data storage system includes a controller coupled to multiple data storage devices. In response to a request, the controller allocates the devices' storage space into a number of storage partitions or "virtual devices." The request specifies the size and function mode for each storage partition. Each storage partition, having the requested size, is operated according to its requested function mode. This involves mapping access commands, which specify virtual addresses, to the proper physical addresses of the appropriate data storage devices.

61 Claims, 7 Drawing Sheets

RECONFIGURABLE DATA STORAGE SYSTEM

BACKGROUND OF THE INVENTION

1. Field of the Invention

The present invention relates to a system for managing data storage devices in a digital computer. More particularly, the invention concerns a method and apparatus to operate a plurality of partition slices provided by multiple data storage devices. After allocating the partition slices into a number of storage partitions according to a user request that specifies the size and function mode for each storage partition, each storage partition is operated according to its function mode.

2. Description of the Related Art

Figure 1:
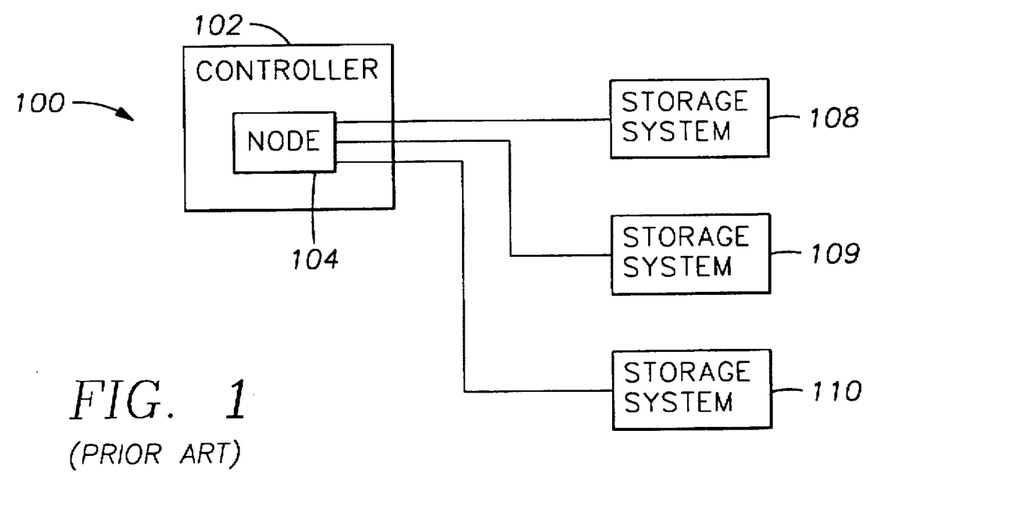
FIG. 1 is a block diagram of a known data storage system.

In the past, a number of data storage systems have employed the architecture of FIG. 1, where a data storage system 100 includes a controller 102 having a single node 104 connected to one or more storage subsystems 108–110. The node 104 is typically embodied in a device such as a microprocessor. Each storage subsystem 108–110 includes multiple data storage devices, also called "head disk assemblies" or "HDAs". The data storage devices may employ data storage media such as magnetic storage disks as found in a computer "hard drive."

The storage subsystems 108–110 may be identical, or diverse. For example the first storage subsystem 108 may include hardware particular to a RAID-5 system, the second subsystem 109 may include hardware of a non-RAID system, and the third subsystem 110 may comprise a log structured array ("LSA"). In the data storage system 100, each of the storage subsystems 108–110 includes its own controller to operate the accompanying storage devices in the desired manner. Thus, upon system startup, the subsystem 108 is operable as a RAID-5 system the subsystem 109 is operable as a non-RAID system; and, the subsystem 110 is operable as a LSA.

The data storage system 100 provides an effective way of storing data in different types of storage subsystems, within the constraints of a single architecture. Nonetheless, some users may require greater flexibility in their data storage. A user's data storage needs may eventually require, for example, more RAID-5 storage space and less non-RAID storage space. In the data storage system 100, however, such changes require a potentially expensive purchase of new hardware or a possibly complicated modification of existing hardware.

Another potential problem is that, when one of the storage subsystems 108–110 is filled with data, it cannot store any more data even though another one of the subsystems may be partially full or even empty.

SUMMARY OF THE INVENTION

Broadly, one aspect of the present invention concerns a data storage system, including a storage subsystem with a multiplicity of data storage devices, each data storage device including storagge media containing portions of multiple partition slices. Each partition slice, for example, may comprise a selected number of bytes. The data storage devices together may provide a homogeneous or heterogeneous grouping of magnetic disk storage units, magnetic tape units, optical cartridges, or other digital data storage apparatuses. An interface couples the data storage devices to a controller, which receives input from a user input device. The controller includes one or more nodes programmed to manage allocation of the partition slices. The nodes may, for instance, comprise microprocessors.

The controller creates a map comprising an ordered representation of the partition slices. The controller receives requests to allocate the partition slices into a number of storage partitions or "virtual devices." These requests may originate from the user input device, or another source such as a host computer, application program, etc. Each request includes a size and a function mode for each storage partition. Based on the request, the controller operates each storage partition as a virtual device, according to its requested function mode. This involves receiving input data access commands, including virtual addresses compatible with virtual devices, and mapping the data access command to the appropriate physical storage locations of the data storage devices.

In an illustrative embodiment, the function modes may include non-RAID, LSA, and various types of RAID, such as RAID-0, RAID-1, RAID-3, RAID-4, and RAID-5. Therefore, if the user submits a size and function mode request specifying 30 Mb of RAID-5, the controller allocates storage partitions sufficient to provide a 30 Mb storage partition, and operates these partition slices as a RAID-5 virtual device.

Another aspect of the invention involves a method for operating a data storage subsystem. Still another aspect of the invention involves a data storage device, tangibly embodying a program of instructions to manage operation of a data storage subsystem.

The invention affords its users with a number of distinct advantages. First, the invention provides flexibility in data management, because the user can selectively store data in different storage partitions having different operating characteristics. The storage subsystem can therefore be optimized based on cost, performance, and availability of its components. Moreover, the user saves money by foregoing the purchase of different storage subsystems to implement different memory storage devices. With the present invention, a pool of data storage devices can be selectively apportioned to effectively provide different storage subsystems with different operating characteristics, e.g. RAID-5, LSA, non-RAID, etc. Advantageously, unused partition slices may be reassigned from one storage partition to a different storage partition. Another benefit of the invention is achieved by using multiple nodes, which provides redundancy in case of a node failure and also permits balancing of workload among the nodes. The present invention also provides a number of other benefits, as described below.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Broadly, the present invention concerns a system for managing data storage devices in a digital computing system. An apparatus aspect of the invention involves a data storage system with a multiplicity of data storage devices that provide a reconfigurable data storage subsystem. A process aspect of the invention concerns a method for operating a reconfigurable data storage subsystem.

STRUCTURE

Figure 2A:
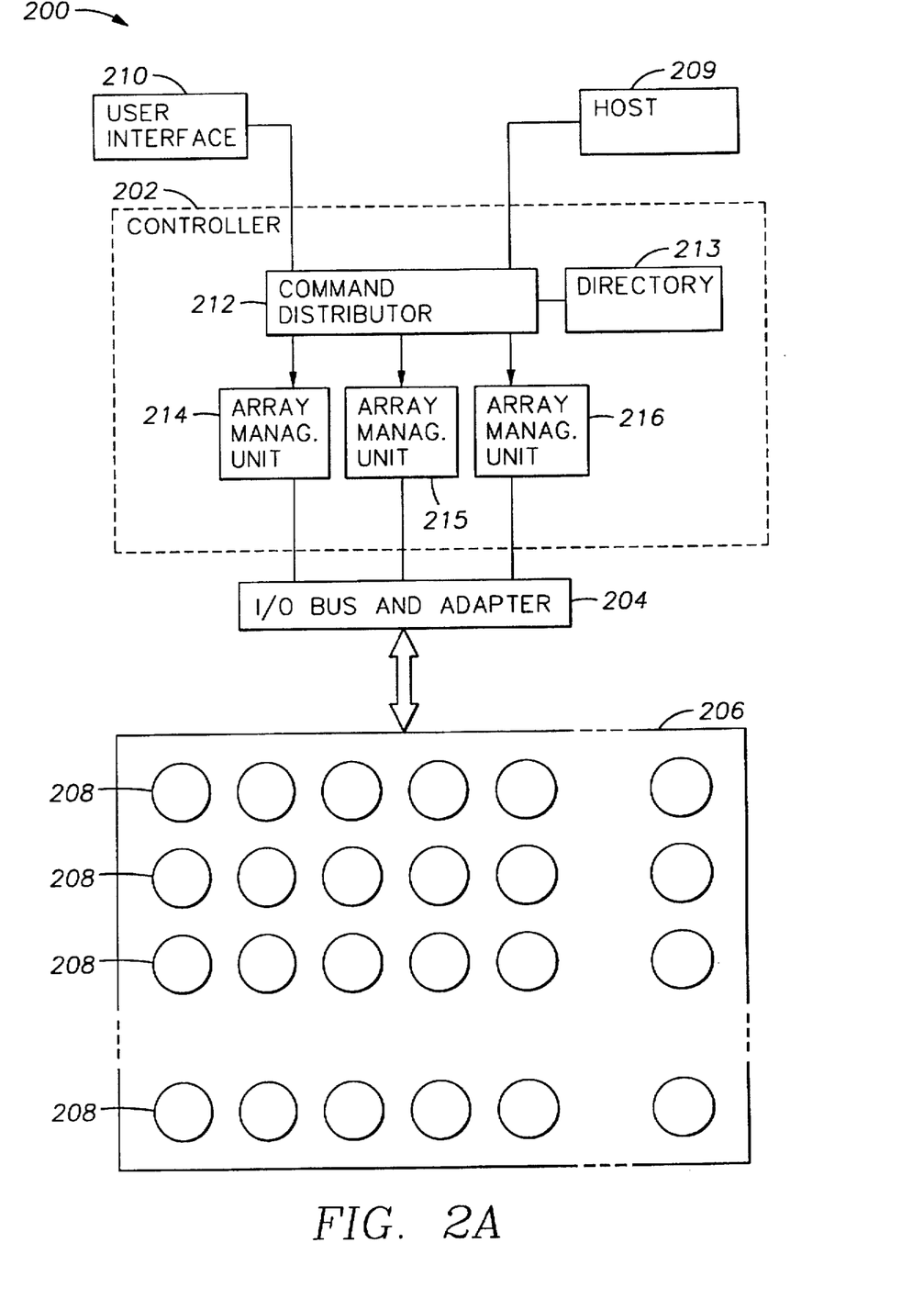
FIG. 2A is a block diagram of the hardware components and interconnections of a data storage system pursuant to the invention.

As shown in FIG. 2A, the hardware components and interconnections of the invention provide a data storage system 200 that basically includes a controller 202, an I/O bus and adapter 204 coupled to the controller 202, and a storage subsystem 206 coupled to the storage interface 204. The I/O bus and adapter 204 is also called an "interface." The system 200 may also include a host 209, which exchanges commands and data with the controller 202 as discussed below. Additionally, a user interface 210 is connected to the controller 202, to aid a user (not shown) in providing input to the controller 202. The user interface 210 may comprises, for instance, a keyboard, mouse, voice recognition apparatus, or a number of other means for providing human input to the controller 202.

The storage subsystem 206 includes a multiplicity of data storage devices 208, each of which is accessible via the interface 204. The data storage devices 208 may comprise a number of different devices, such as magnetic storage disks, optical storage disks, optical or magnetic tape media, RAM, etc. The data storage devices 208 may together provide a homogeneous or a heterogenous group of storage devices, depending upon the application's requirement. If desired, even devices 208 of the same type may vary in various operating characteristics, such as throughput, storage capacity, etc.

The controller 202 preferably comprises a microprocessor such as the INTEL model i960™. The interface 204 may comprise, for example, an apparatus employing serial storage architecture ("SSA"). The controller 202 manages the data storage devices 208 of the storage subsystem 206 using a number of components, an example of which is described as follows. As shown in FIG. 2A, the controller 202 includes command distributor 212, a directory 213, and multiple array management units 214–216. Broadly, these features enable the controller 202 to manage the storage subsystem 206 as a member of independent user-selected storage partitions, such as a RAID-5 partitions, an LSA partition, a non-RAID partition, etc.

More particularly, the command distributor 212 first receives memory access commands from the host 209 or user interface 210, each command identifying a location of data within the storage subsystem 206 and a type of storage operation, such as a Read or Write operation. In the illustrated embodiment, the memory access command identifies the location of data by identifying a "volume" of data stored in the subsystem 206 and an address within the volume. In this example, each storage partition completely contains one or more volumes of data. The volume information therefore constitutes a "virtual address" to storage locations or one of the "virtual devices" provided by the storage partitions. After receiving a memory access command, the command distributor 212 consults the directory 213 to identify the storage partition corresponding to the volume specified in the memory access command. Having identified the desired storage partition, the command distribution 212 forwards the command to an appropriate one of the array management units 214–216 corresponding to the proper storage partition. Further understanding of array management may be obtained with reference to the RAIDbook-A Source Book for Disk Array Technology (4th ed.), available from the RAID Advisory Board, St. Peter, Minn., this reference being incorporated herein by reference in its entirety.

Figure 2B:
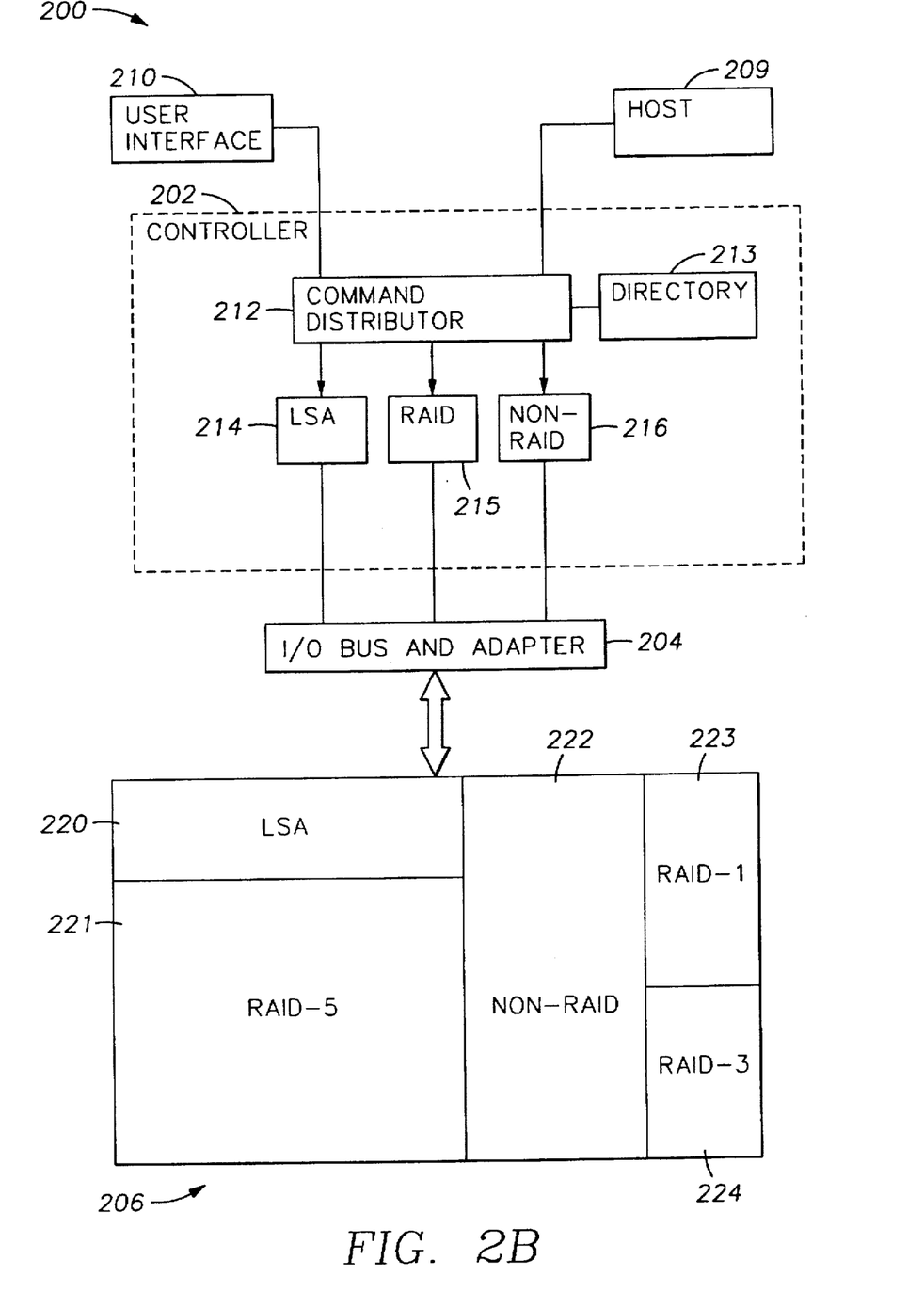
FIG. 2B is a block diagram of the hardware components and interconnections of the data storage system of FIG. 2A, configured and implemented pursuant to the invention.

FIG. 2B depicts a more specific example of the data storage system 200. In this example, the array management units 214–218 include units designed to manage LSA type storage (unit 214), RAID type storage (unit 215), and non-RAID storage (unit 216). Without requiring any alteration to the data storage devices 208, the devices 208 are partitioned to provide a LSA storage device 220, a RAID-5 storage device 221, a non-RAID storage device 222, a RAID-1 storage device 223, and a RAID-3 storage device 224. Thus, the array management units 214–216 in effect manage a number of virtual storage devices 220–224.

When the command distributor 212 receives a memory access command identifying a volume contained in the LSA partition 220, the distributor 212 forwards the memory access command to the LSA array management unit 214, which maps the virtual address specified by the memory access command into the appropriate physical address within the partition slices allocated for use as the LSA partition 220. Likewise the distributor 212 forwards memory access commands having virtual addresses within the non-RAID partition 222 to the non-RAID array management unit 216 for mapping to the appropriate physical address within the partition slices allocated for use as the non-RAID partition 222.

Figure 3:
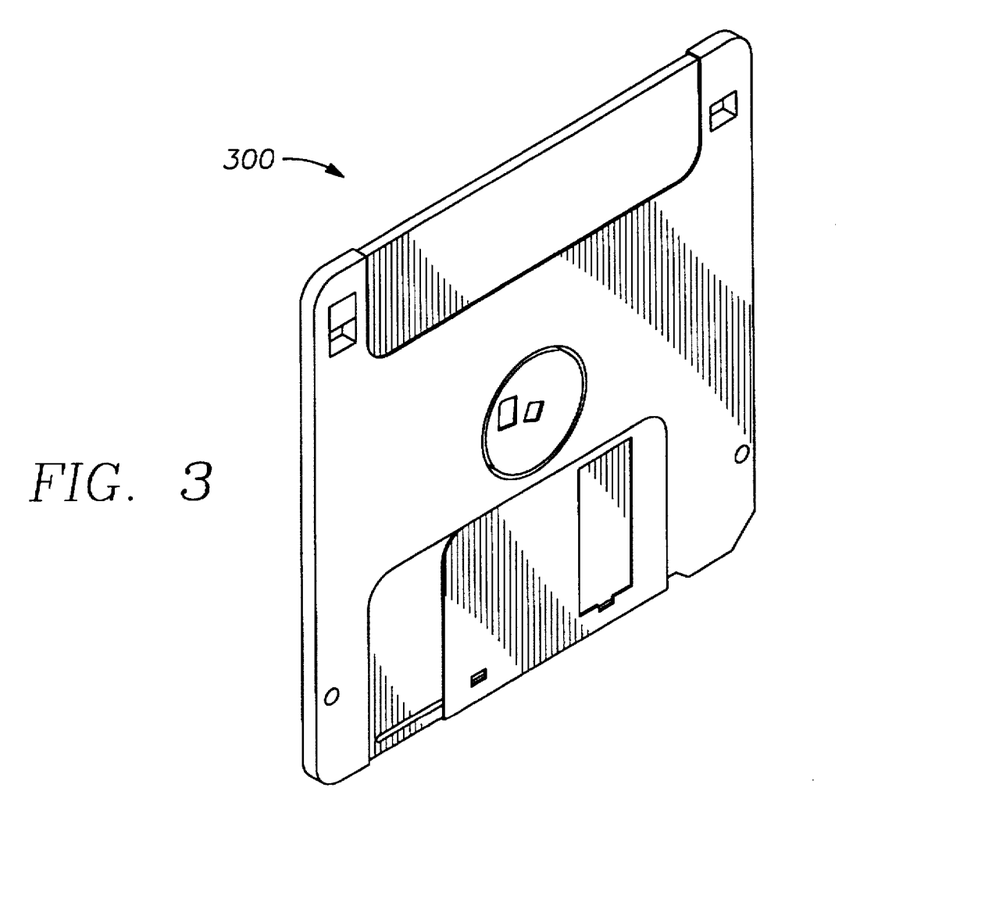
FIG. 3 is an illustrative data storage medium for use by the controller pursuant to the invention.

In one embodiment, the controller 202 may manage operation of the storage subsystem 206 by executing array management software comprising a series of computer-readable programming instructions. Alternatively, these functions may be performed individually by the array management units 214–216 executing separate respective sequences of computer-readable programming instructions. In either case, the programming instructions may be contained on a data storage medium such as an EPROM, PLA, ECL, or another medium fixedly coupled to the controller 202. Instead, the programming instructions may be contained on a data storage medium detachably coupled to the controller 202, such as a computer diskette 300 (FIG. 3), a DASD array, a magnetic tape, a conventional "hard disk drive", electronic read-only memory, an optical storage device, a set of paper "punch" cards, or another suitable data storage medium. Alternatively, the programing instructions may be contained in a reserved space of the storage subsystem 206, such as in a private file system space, discussed below. The programming instructions may, for example, comprise lines of compiled C++ code.

Operation of the system 200 may be further understood with reference to the detailed description of the invention's operation, set forth below.

OPERATION

General Description

Figure 4:
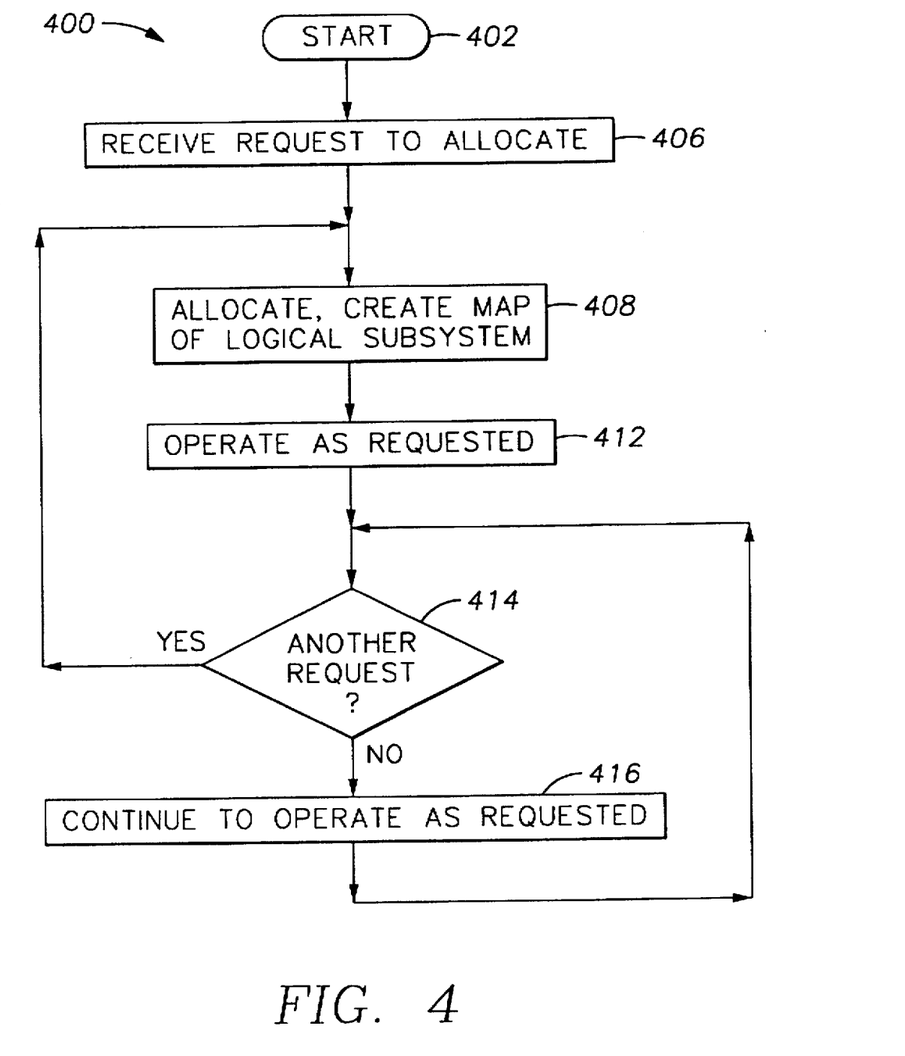
FIG. 4 is an illustrative sequence of steps for managing a data storage subsystem pursuant to the invention.

FIG. 4 depicts a sequence of tasks 400 that illustrate one embodiment of the invention's operation. The sequence 400 serves to manage a reconfigurable data storage subsystem.

such as the subsystem 206. For ease of illustration, the sequence 400 is discussed in the context of the exemplary hardware configuration of FIG. 2B.

Request for Allocation

The sequence 400 begins in task 402. In task 406 the controller 202 receives a request to allocate the subsystem 206 into a number of storage partitions, also called "virtual devices." For each storage partition, the request includes a "storage capacity"and a "function mode". The storage capacity refers to the total amount of data storage provided by a storage partition, e.g. 30 Mb. The function mode pertains to different operating characteristics of a storage partition and includes at least a "storage type", which identifies the way in which a particular storage partition operates, e.g. RAID-5, RAID-0, non-RAID, LSA, etc. The function mode may also include a number of other operating characteristics, such as parity level, parity rotation, sparing level, sparing rotation, data width, and data width rotation.

"Parity level" concerns the number of physical devices in a storage partition that are devoted to the storage of parity information. The parity level preferably comprises a number Such as zero or one. In a storage partition having 8 devices, with a parity level of one, there would be one physical device for parity information storage and 7 physical devices for data storage. Although certain portions of each storage device are actually allocated to store parity bits corresponding to data stored in the other storage devices, for ease of discussion storage systems are often described as having a particular "parity device" dedicated to the storage of parity information. Identically sliced blocks of parity information may be distributed across the storage devices of a storage partition in a desired pattern; in this respect, the requested parity level may also include a "parity rotation", specifying the size of each parity block.

"Sparing level" concerns the number of logical devices in a storage partition that are set aside as "spare" logical devices, useful in the event of a device failure, for example. Analogous to the parity level in many respects, the sparing level preferably comprises an integer, and may also include a "sparing rotation" to determine the size of each spare block. "Data width" concerns the number of physical devices in each storage partition that are devoted to data storage, i.e. not parity or spare devices. The data width may also encompass a specification of "data rotation", analogous to parity and sparing rotation.

Allocation

After task 406, the controller 202 in task 408 carries out the requested allocation and stores a representative map in the directory 213. This map may comprise a lookup table, for example. This map translates between the user-specified volume information in the memory access command and the physical storage space of the storage devices 208. If each volume is coterminous with a storage partition, the map translates between the user-specified volume information and the virtual devices provided by the user-requested storage partitions.

Figure 5:
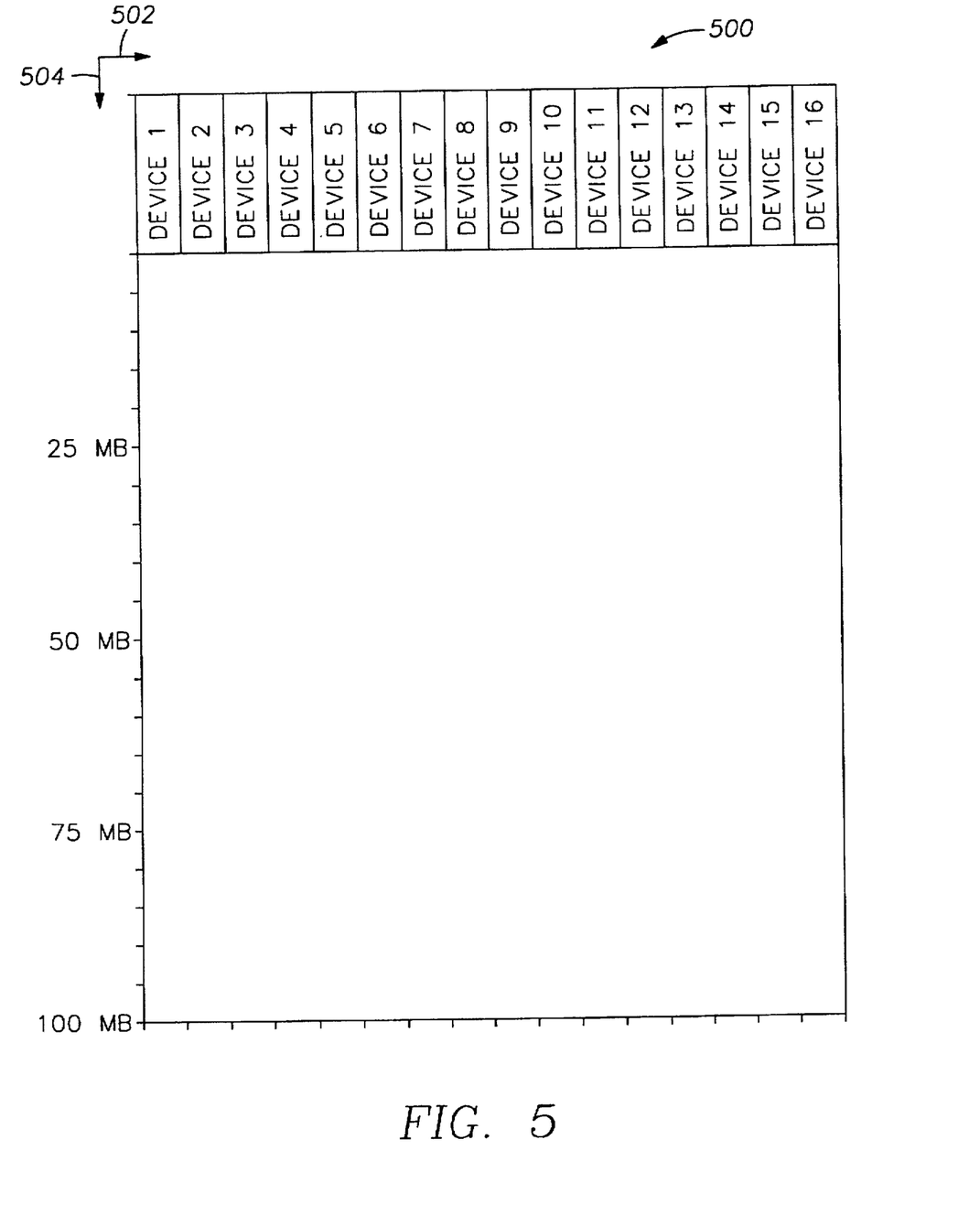
FIG. 5 is a preliminary mapped storage array pursuant to the invention.

In performing task 408, the controller 202 first maps the aggregate storage space contained on all of the devices 208; this involves determining the total amount of storage space available in the subsystem 206, and then dividing this storage space into a multiplicity of partition slices of one or more appropriate sizes. To illustrate this with an example, FIG. 5 depicts the storage space of all devices 208 mapped into a preliminary array 500, where one axis 502 represents different devices 208 and the other axis 504 represents the storage space of each device 208. With the preliminary array 500 each column represents the storage space of one physical storage device 208. Each row represents corresponding addresses, either logically or physically, of all illustrated devices 208 together.

Next in task 408, the storage space is divided into partition slices, and the partition slices are allocated to the different storage partitions. Each partition slice preferably resides across multiple storage devices 208. Therefore, each storage device preferably includes parts of multiple partition slices. Each partition slice is preferably sized appropriately to serve the user's allocation request. The use of partition slices provides great flexibility in allocating and re-allocating the virtual devices. The division into partition slices may be performed according to various schemes. For example, one scheme is a time-based priority scheme and another is a "best fit" scheme. In the time-based priority scheme, the storage space of the subsystem 206 is allocated on a "first come, first served" basis. Here, the user's first requested storage partition is positioned in the lowest row and column position of the array 500, i.e. top-left. The other storage partitions are placed in ensuing rows and columns, proceedinig right-to-left, top-to-bottom, or in another designated order. In contrast, under the "best fit" scheme the controller 202 considers all of the user's requested storage partitions together before allocating any, and then allocates the storage space of the subsystem 206 to best accommodate the different sizes and types of requested storage partitions.

Ongoing Operation

After the allocation of task 408 is completed, the now-defined storage partitions are operated in task 412 according to their requested function mode. Namely the distributor 212 directs memory access commands to the array management units 214-216, each of which exchanges data with the appropriate physical storage address of the corresponding partition 220-224.

Query 414 recognizes when the controller 202 receives another request for storage partition allocation. When this happens, control is returned to task 408 for reallocation. Otherwise, the controller 202 in task 416 continues to operate the defined storage partitions according to their requested function mode and parity level, as in task 412.

Example

To better understand the sequence 400, Table 1 provides an exemplary user request, whose processing is discussed below. In this example, the subsystem 206 includes 16 storage devices 208, each device including 100 Mb of storage, as shown in FIG. 5.

TABLE 1

Exemplary Storage Partition Requests

| REQUEST | STORAGE CAPACITY AVAILABLE FOR DATA STORAGE | PARITY LEVEL | STORAGE TYPE | SPARING | DATA WIDTH |
|---|---|---|---|---|---|
| 1st (602) | 175 Mb storage partition, | 1 | RAID-5 | 0 | 7 |
| 2nd (603) | 150 Mb storage partition, | 1 | LSA | 1 | 3 |
| 3rd (604) | 50 Mb storage partition, | 0 | non-RAID | 0 | X |
| 4th (605) | 175 Mb storage partition, | 1 | RAID-5 | 0 | 7 |
| 5th (606) | 100 Mb storage partition, | 0 | RAID-0 | 0 | 2 |

First, the preliminary array 500 is created. The array 500 represents the aggregate storage space contained on all of the 16 devices 208 together. The array 500 includes one column for each device, and one row for each 5 Mb of storage. These dimensions are merely exemplary however, and they may be changed by an ordinarily skilled artisan (with the benefit of this disclosure) to suit a particular application.

Figure 6:
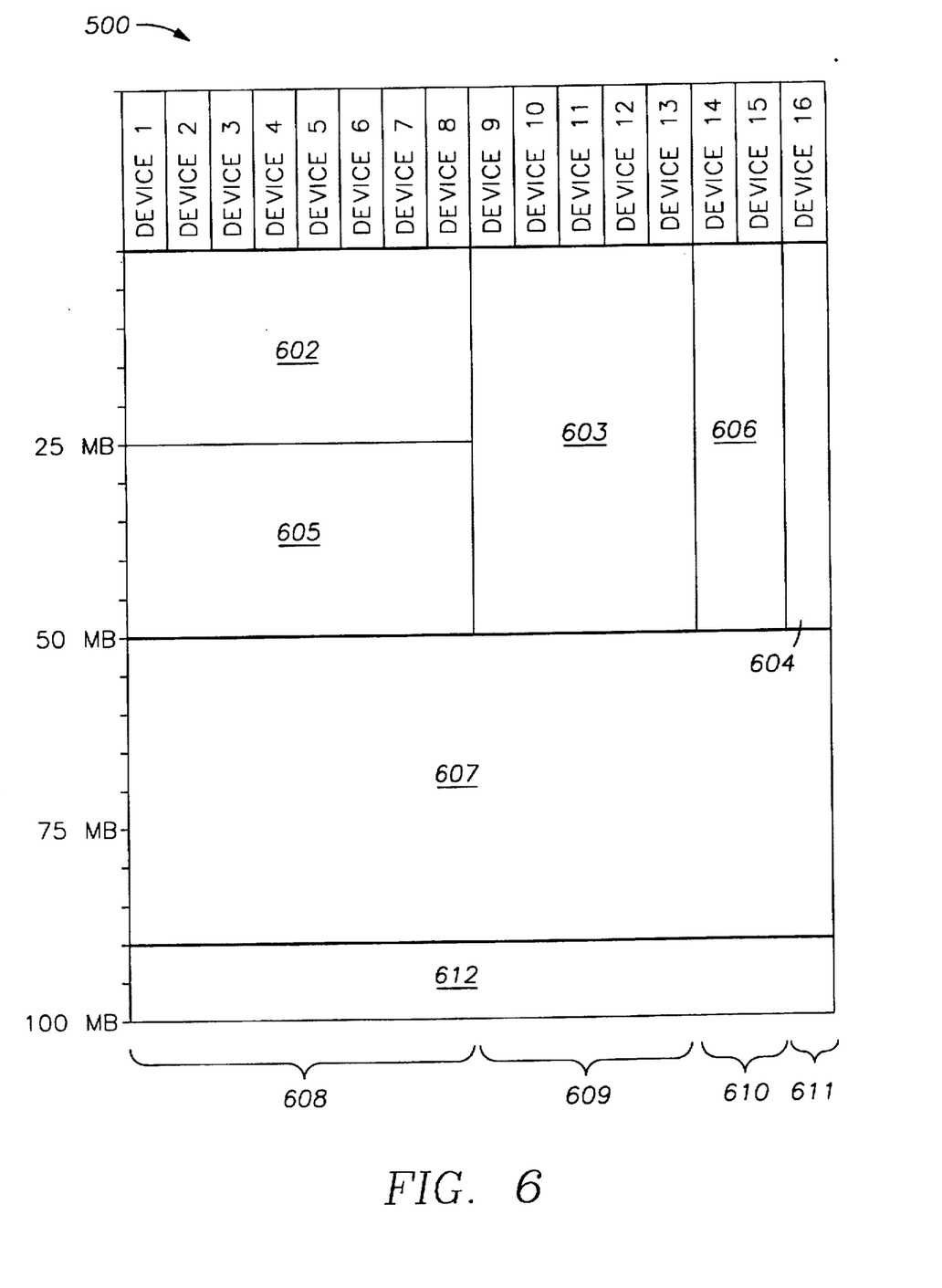
FIG. 6 is a fully mapped storage array pursuant to the invention.

Having created the preliminary array 500, the controller 202 divides the storage space into partition slices as needed, performs the requested allocation, and stores a representative map in the directory 213. The illustrated example uses the time-priority allocation method. Accordingly, the user's first request concerns a 175 Mb storage partition, with a parity level of one, a RAID-5 type, sparing level of zero, and data width of 7. Since each partition slice preferably resides across multiple devices, and the partition slices are allocated beginning with the top-left of the array 500, the first requested storage partition is given by 602 (FIG. 6). Each partition slice of the storage partition 602 spans the 1st through 8th devices. With this allocation, devices 1-7 are dedicated to data storage the 8th device serving to store parity information.

Since the widths of the partition slices of each storage partition are determined by the number of devices in that storage partition, the depth of the partition slices determines the slices' size. For instance, if each partition slice of the storage partition 602 is to occupy 8 Mb, then each partition slice has a depth of 1 Mb, i.e. occupies 1 Mb on each device. The size of the partition slices may be predetermined or user-selected, depending upon the particular needs of the application.

Continuing this process, the user's 2nd through 5th requests are carried out by creating the storage partitions 603-606. The region 607 represents unallocated storage space of the subsystem 206. If the operating instructions of the controller 202 are to be stored in the subsystem 206, then a private file system space 612 may be allocated for that purpose.

If desired, these and future allocations may be made to observe "device group partitions", which serve to completely divide certain physical storage devices into partition slices of one size. For instance, the 1st–8th devices, 9th–13th devices, and 14th–16th devices may be designated as device group partitions 608–610, respectively.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

For example, in an alternative embodiment the system 200 may by implemented to provide a multi-node data storage system 700 (FIG. 7) with systems redundancy for greater reliability. The system 700 includes a controller 702 with multiple nodes 702a–702d. Each of the nodes 702a–702d, for example, may comprise an INTEL model i960 microprocessor. The controller 702 is coupled to a user interface 703 and first and second storage subsystems 704, 706. The subsystems 704, 706 each include a multiplicity of storage devices 708, 710. The subsystem 704 is coupled to the nodes 702c–702d via a pair of storage interfaces 712–713, respectively. Likewise, the subsystem 706 is coupled to the nodes 702a–702b via a pair of storage interfaces 714–715, respectively.

Figure 7:
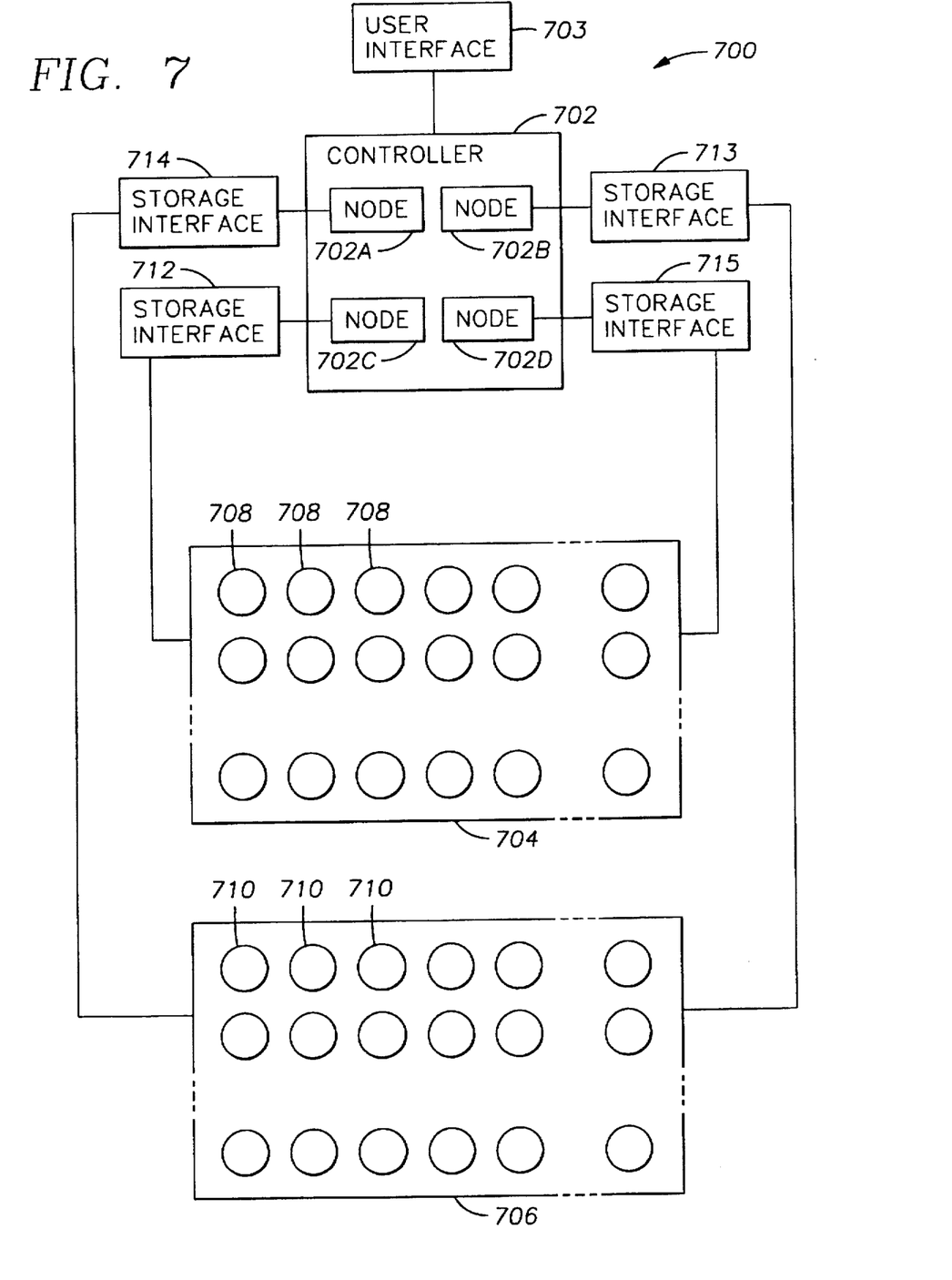
FIG. 7 is a block diagram of the hardware components and interconnections of a multi-node data storage system pursuant to the invention.

The system 700 preferably provides shared management, where all nodes 702a–702d have access to all devices 708–710. However, each node is preferably assigned exclusive control over a selected group of storage devices, irrespective of the storage partition boundaries. For example, in the subsystem 704, the node 702c may operate devices 1–8 with the node 702d operating the devices 9–16. This provides redundancy in case one of the nodes fails, since another node can then operate the storage devices previously managed by the failed node. Additionally, this permits reassignment of storage devices from one node to another, to balance the nodes' workload.

What is claimed is:

1. A data storage system, comprising:

a multiplicity of data storage devices together providing an aggregate amount of storage space;

a storage interface coupled to the data storage devices;

an input device;

a controller coupled to the interface and the input device and including a node programmed to manage allocation of storage partitions by performing steps comprising:
   identifying the aggregate amount of storage space provided by the data storage devices;
   receiving from the input device a request to allocate the storage space into a number of storage partitions, said request including for each storage partition a storage capacity and a device-feature emulation mode;

in response to the request, creating a map of the storage space, said map allocating for each storage partition sufficient storage space from at least one of the data storage devices to provide the requested storage capacity; and operating each storage partition according to its device-feature emulation mode.

2. The system of claim 1, the node being programmed such that the creating step comprises the steps of creating a map of storage space dividing the storage space into a multiplicity of partition slices having at least one size, said map allocating for each storage partition a number of partition slices of like size to provide the requested storage capacity.

3. The system of claim 2, each data storage device containing portions of multiple partition slices.

4. The system of claim 1, wherein the controller is programmed such that the device-feature emulation mode includes for each storage partition a storage type.

5. The system of claim 4, wherein the device-feature emulation mode includes selection of a speed of operation.

6. The system of claim 1, wherein the controller is programmed such that the device-feature emulation mode includes for each storage partition a parity level.

7. The system of claim 6, wherein the parity level includes a number of parity devices and a parity rotation.

8. The system of claim 1, wherein the controller is programmed such that the device-feature emulation mode includes for each storage partition a data width.

9. The system of claim 8, wherein the data width includes a number of data devices and a data rotation.

10. The system of claim 1, wherein the controller is programmed such that the device-feature emulation mode includes for each storage partition a sparing level.

11. The system of claim 10, wherein the sparing level includes a number of spare devices and a sparing rotation.

12. The system of claim 4, wherein the storage type is selected from a list including at least one type of RAID.

13. The system of claim 4, wherein the storage type is selected from a list that includes a non-RAID type.

14. The system of claim 4, wherein the storage type is selected from a list including LSA.

15. The system of claim 1, wherein the controller includes multiple nodes each coupled to selected data storage devices via the interface.

16. The system of claim 15, wherein the selected data storage devices comprise all of the data storage devices.

17. The system of claim 1, wherein the data storage devices include optical storage disks.

18. The system of claim 1, wherein the data storage devices include magnetic data storage disks.

19. The system of claim 1, wherein the data storage devices include magnetic data storage tapes.

20. The system of claim 1, wherein the data storage devices include a number of data storage devices with a first throughput and a number of data storage devices with a second throughput different from the first throughput.

21. The system of claim 2, wherein all partition slices have the same size.

22. The system of claim 2, wherein the partition slices have multiple different sizes.

23. A data storage system, comprising:
a multiplicity of data storage devices together providing an aggregate amount of storage space;
a storage interface coupled to the data storage devices;
a user input device;
a controller coupled to the interface and the input device and including multiple nodes, wherein said controller is programmed to manage allocation of the storage partitions by performing steps comprising:
identifying the aggregate amount of storage space provided by the data storage devices;
receiving from the input device a request to allocate the storage space into a number of storage partitions, said request including for each storage partition a storage capacity, and a device-feature emulation mode;
creating a map of the storage space, said map allocating for each storage partition sufficient storage space from at least one of the data storage devices to provide the requested storage capacity; and
operating each storage partition according to its device-feature emulation mode.

24. The system of claim 23, wherein the controller is programmed to direct each node to operate all portions of any storage partition residing on a group of storage devices exclusively assigned to that node.

25. The system of claim 23, wherein the data storage devices include optical storage disks.

26. The system of claim 23, wherein the data storage devices include magnetic data storage disks.

27. The system of claim 23, wherein the data storage devices include magnetic data storage tapes.

28. The system of claim 24, wherein the controller is further programmed to dynamically re-assign the groups of storage devices assigned to the nodes to balance workload among the nodes.

29. The system of claim 24, wherein the controller is further programmed to re-assign the groups of storage devices assigned to the nodes to compensate for a failure of a node.

30. A method for operating a data storage system comprising a multiplicity of data storage devices together providing an aggregate amount of storage space, a storage interface coupled to the data storage devices, a controller coupled to the interface and including a node to manage allocation of the partition slices, said method comprising the steps of:
identifying the aggregate amount of storage space provided by the data storage devices;
receiving a request to allocate the storage space into a number of storage partitions, said request including for each storage partition a storage capacity and a device-feature emulation mode;
creating a map of the storage space, said map allocating for each storage partition sufficient storage space from at least one of the data storage devices to provide the requested storage capacity; and
operating each storage partition according to its device-feature emulation mode.

31. The method of claim 30, creating step comprising the steps of creating a map of storage space dividing the storage space into a multiplicity of partition slices having at least one size, said map allocating for each storage partition a number of partition slices of like size to provide the requested storage capacity.

32. The method of claim 31, each data storage device containing portions of multiple partition slices.

33. The method of claim 30, wherein the request is received from an input device coupled to the controller.

34. The method of claim 30, wherein the device-feature emulation mode includes for each storage partition a storage type.

35. The method of claim 30, wherein the device-feature emulation mode includes selection of a speed of operation.

36. The method of claim 30, wherein the device-feature emulation mode includes for each storage partition a parity level.

37. The method of claim 36, wherein the parity level includes a number of parity devices and a parity rotation.

38. The method of claim 30, wherein the device-feature emulation mode includes for each storage partition a data width.

39. The method of claim 38, wherein the data width includes a number of data devices and a data rotation.

40. The method of claim 30, wherein the device-feature emulation mode includes for each storage partition a sparing level.

41. The method of claim 40, wherein the sparing level includes a number of spare devices and a sparing rotation.

42. The method of claim 34, wherein the operating step includes a step of operating each storage partition according to its requested storage type.

43. The method of claim 34, wherein the storage type is selected from a list including at least one type of RAID.

44. The method of claim 34, wherein the storage type is selected from a list including LSA.

45. The method of claim 30, wherein the storage type is selected from a list that includes a non-RAID type.

46. The method of claim 30, wherein the controller includes multiple nodes and the operating step comprises the steps of using each node to operate all portions of any storage partition residing on a group of storage devices exclusively assigned to that node.

47. A data storage device tangibly embodying a program of instructions executable by a digital data processor to perform steps to manage a data storage subsystem of multiple data storage devices, said steps comprising:

identifying an aggregate amount of storage space provided by the data storage devices;

receiving a request to allocate the storage space into a number of storage partitions, said request including for each storage partition a storage capacity and a device-feature emulation mode;

creating a map of the storage space, said map allocating for each storage partition sufficient storage space from at least one of the data storage devices to provide the requested storage capacity; and operating each storage partition according to its device-feature emulation mode.

48. The data storage device of claim 47, wherein the request is received from an input device coupled to the controller.

49. The data storage device of claim 47, wherein the device-feature emulation mode includes for each storage partition a storage type.

50. The data storage device of claim 47, wherein the device-feature emulation mode includes selection of a speed of operation.

51. The data storage device of claim 47, wherein the device-feature emulation mode includes for each storage partition a parity level.

52. The data storage device of claim 51, wherein the parity level includes a number of parity devices and a parity rotation.

53. The data storage device of claim 47, wherein the device-feature emulation mode includes for each storage partition a data width.

54. The data storage device of claim 53, wherein the data width includes a number of data devices and a data rotation.

55. The data storage device of claim 47, wherein the device-feature emulation mode includes for each storage partition a sparing level.

56. The data storage device of claim 55, wherein the sparing level includes a number of spare devices and a sparing level.

57. The data storage device of claim 49, wherein the operating step includes a step of operating each storage partition according to its requested storage type.

58. The data storage device of claim 49, wherein the storage type is selected from a list including at least one type of RAID.

59. The data storage device of claim 49, wherein the storage type is selected from a list including LSA.

60. The data storage device of claim 47, wherein the storage type is selected from a list that includes a non-RAID type.

61. The data storage device of claim 47, wherein the controller includes multiple nodes and the operating step comprises the step of using each node to operate all portions of any storage partition residing on a group of storage devices exclusively assigned to that node.

* * * * *